JAMES HARRIS.
Improvement in Harvester Rakes.
No. 115,052. Patented May 23, 1871.
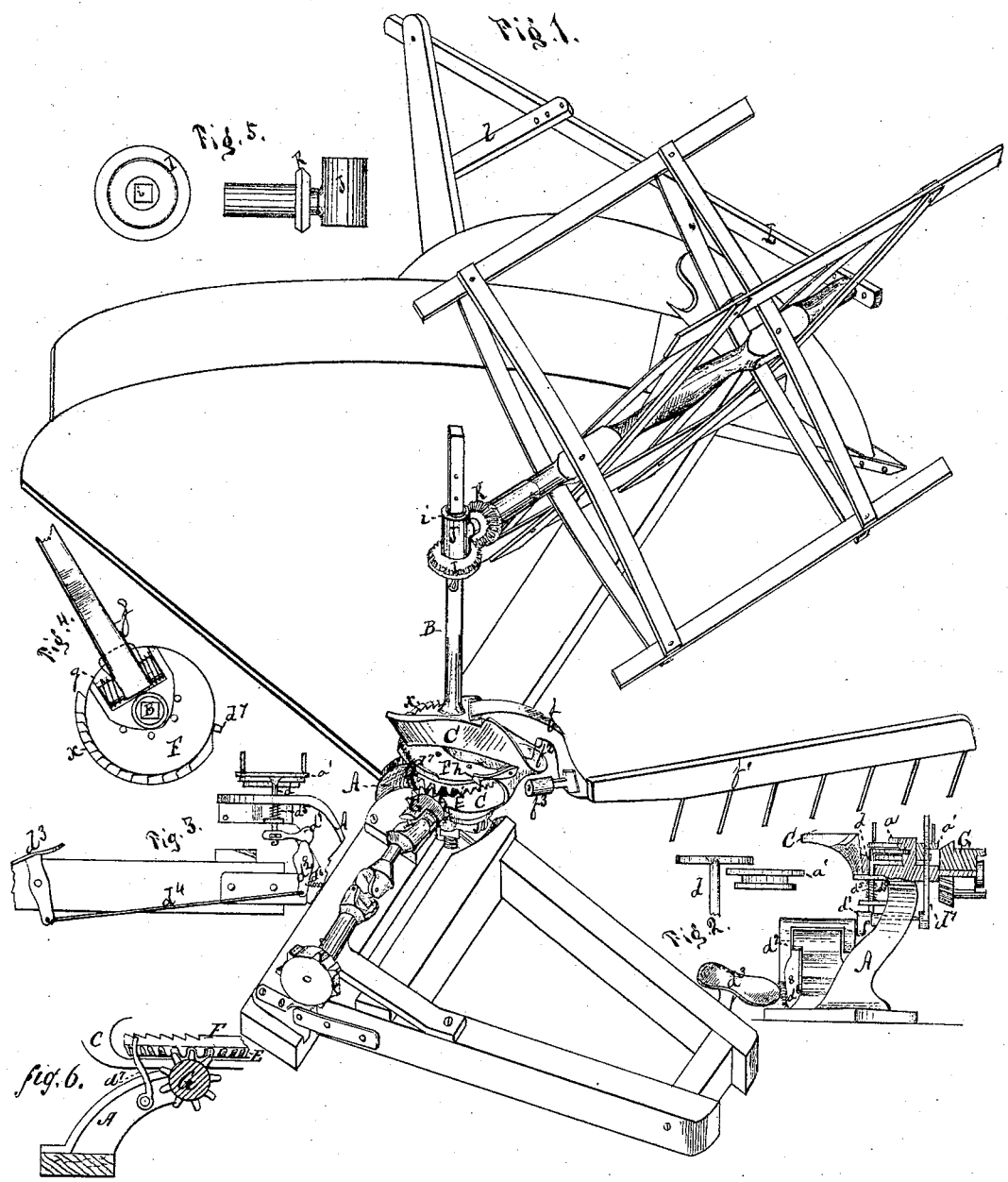

No. 115,052

UNITED STATES PATENT OFFICE.

JAMES HARRIS, OF JANESVILLE, WISCONSIN.

IMPROVEMENT IN HARVESTER-RAKES.

Specification forming part of Letters Patent No. 115,052, dated May 23, 1871.

*To all whom it may concern:*

Be it known that I, JAMES HARRIS, of Janesville, in the county of Rock and State of Wisconsin, have invented a new and useful Improvement in Harvester-Rake; and I do hereby declare that the following is a full and exact description of the same, reference being had to the accompanying drawing and to the letters of reference marked thereon.

This invention relates to that class of harvesters which are provided with one or more rakes revolving about a vertical or nearly vertical center, the rakes being employed for the purpose of sweeping the cut grain off from the platform; and consists in certain details of construction, which will be fully described hereinafter.

In the drawing, Figure 1 represents a perspective view of my improvement as applied to a harvester. Fig. 2 represents an elevation, partially in section, of the standard supporting the rake-operating devices, and also the mechanism for disconnecting the rake from the moving parts. Fig. 3 represents a side elevation of the disconnecting mechanism, and the levers for operating the same. Fig. 4 represents a plan view of the rake-carrying hub and vertical shaft. Fig. 5 represents views of the sleeve and gearing for connecting the reel with the vertical shaft. and Fig. 6 represents a side elevation of the standard, gear-wheel, hub, and brake-arm.

To enable others skilled in the art to which my invention appertains to make and use the same, I will now proceed to describe fully its construction and manner of operation.

As my invention relates particularly to the devices for operating the rake and reel, the other parts of the machine will not be described.

The carrying portions of the machine and the devices for cutting the grain may be of any proper construction.

The grain is operated upon in the usual manner by the reel, and, being cut by the knives, is thrown onto the platform, from whence it is swept by the rake at suitable intervals.

A represents a supporting-standard, which may be attached to any suitable point upon the harvester-frame. Its upper end is provided with a central socket, in which rests the lower end of the vertical shaft B. The upper face of the standard has secured to it the base of the cam-way C, and is also provided with a cylindrical projection, $a$, upon which is placed the clutch-collar $a'$. This collar is constructed with a groove, in which rest the curved fingers of the shipping-arm $d$. The upper face of the collar is provided with projecting pins, the upper ends of which, passing through suitable holes in the face of gear-wheel E, rest in orifices in the rake-carrying hub F. G represents a pinion, supported by a spindle attached to the outer side of the upper end of the standard A, which is connected by any convenient mechanism to the driving power of the machine. The rake-carrying hub F is loose upon the shaft B, being secured in place by the gear-wheel E, and above by a washer or projection upon the shaft B. If desired, the hub F may revolve upon the hub of the gear-wheel E. The construction of the hub F is peculiar. Its base corresponds in area with gear-wheel E below, excepting that on one side it is provided with a projecting edge, $x$, the upper face of which is notched as shown in Fig. 1. It has also attached to it the curved rake-arm $f$, carrying the rake $f^1$, which is journaled in a suitable socket rising from the base. The arm is curved in order that it may pass beneath the reel when the latter is adjusted for low grain. It is also provided with a projection, $f^2$, and friction-roller $f^3$, attached to a proper spindle, as shown. $g$ represents a spring, of any suitable construction, which is connected to the rake-arm and hub in such manner as to press the former upward more or less slightly, and thus balance to some extent its weight. $h$ represents a pawl or dog attached to the cam-way C, which permits the revolution of the rake-carrying hub F in one direction, but prevents its motion in the other. The vertical shaft B has its upper end made square, and upon it is slipped the gear-wheel I, with the projecting socket $i$ with square center, as shown. Upon the socket $i$ is slipped the sleeve J, which forms a bearing for the shaft of pinion K of the reel. If desired, however, the shaft may be made round, the gear-wheel being secured by means of a key. The opposite end of the reel is held by an arm, L, supported by a suitable standard, and adjusted by the brace-rod $l$, which is provided with suitable holes for that purpose, the other being adjusted on the vertical shaft also, by means of a pin and suitable orifices, as shown, or by means of a collar and set-screw. The shipping-arm $d$ is connected to the bent lever $d^1$, which is in its turn operated by the lever $d^2$, the latter being actuated by the treadle $d^3$, through the medium of the connecting-rod $d^4$. Springs $d^5$ $d^6$ are suitably arranged to throw the clutch again in operation, after the pressure upon the treadle to throw it out of gear has been removed. The shaft of bent lever $d^1$ extends through its bearing in the standard, and has attached to its opposite end the bent arm $d^7$.

The operation is as follows: Motion is given to the machine in the usual manner, and power is thereby communicated by any suitable intermediate mechanism to the pinion G, which actuates the gear-wheel E upon the vertical shaft B. By the revolution of the shaft B the rake-carrying hub is actuated, and also the reel, as will now be described. The hub F is attached loosely upon the shaft D or hub of the gear-wheel E, and is, consequently, independent of it at times. It is connected to it, however, and caused to revolve with it, when desired, by means of the pins of the clutch-collar $a$, which extend through the gear-wheel E into openings in the hub F, thus connecting the two latter rigidly together. When the hub revolves the rake is caused to traverse the cam-way, by the peculiar form of which it is made to rise, after it has left the platform, from a horizontal to a perpendicular position, which it retains until about half its revolution is completed, when it is permitted to descend and complete its revolution by sweeping across the platform beneath the reel. This result is accomplished by providing the cam-way with ascending and descending curves and plane surfaces at proper points, as may be necessary to produce the desired movements. The rake is guided upon the cam-way by means of the projection $f^1$ and roller $f^2$. The latter serves especially to prevent the rake from rising when it comes in contact with the cut grain. To assist the rake in its movements, particularly when being elevated by the cam-way, and to reduce the friction between the bearing parts, the spring $g$ is provided, which presses upward against the rake-arm, and serves to counterbalance, in part, its weight.

The reel is revolved by means of the gear-wheel I upon the shaft B, which engages with its pinion K. This pinion bears such relation to the gear-wheel I in regard to the number of its teeth as to cause the reel to move as much more rapidly than the shaft as may be desired. In the drawing the pinion K has twenty teeth, while the gear-wheel I has thirty; consequently, the reel revolves one and a half revolution while the gear-wheel and vertical shaft revolve once, and, as the rake when in operation revolves with the shaft, it follows that if the rake be used the reel would revolve one and a half time to one complete movement of the rake. If desired, however, the relative number of teeth can be so changed as to cause the reel to travel at the same speed with the rake, or twice as fast, or to have any other relative movement that may be desired. The relative movements of the rake and reel should be such, however, as to insure their working in perfect harmony—that is, the rake should turn in under one of the reel-bats just before it reaches the platform at each revolution. This result is accomplished by providing the hub F with a number of orifices arranged at regular intervals about its center, in any one of which the clutch-pins rest. The position of one of these orifices may be determined by locating the rake below one of the bats of the reel in the proper position. The hub should then be marked above the clutch-pin, and the orifice bored at that point. The remaining holes may be determined by dividing the circle by measurement; but their number should bear a proper relation to the number of bats upon the reel. When it is desired to disconnect the rake and permit the reel to revolve alone, the clutch-pins are withdrawn from the orifices of the hub F by the lever mechanism previously described. The hub is then independent upon the shaft, which latter continues to revolve and operates the reel. To prevent the rake, however, from being disconnected from the shaft B in any position that would cause trouble—that is, in the uncut grain, or upon the front and central portions of the platform—the projecting edge $x$, Fig. 4, is provided upon the hub, against which bears the bent arm $d^7$, Figs. 2, 4, and 6, which is connected, as before described, to the lever-operating mechanism. This operates as a guard, and effectually prevents the moving of the gear-disconnecting lever so long as the arm bears against the projecting edge. The location of the edge on the hub is such that it bears against the arm always while the rake is moving through those positions in which it would be unsafe or inexpedient to have it caused to stop and remain stationary. The arm $d^7$ also serves another purpose. After the projecting edge $x$ has passed by this arm in the revolution of the hub, the disconnecting-lever may be operated; but by its operation the arm $d^7$, which is connected to it, is brought to bear again against the hub F, and acts as a brake or stop to prevent it from being moved by friction. To explain more fully, the guard-arm $d^1$ is operated by the lever that operates the clutch mechanism. The movement of the guard-arm, and consequently, also, of the clutch-operating lever, is limited, however, to a part of the revolution of the hub by means of the projecting edge $x$ of the latter, which prevents the movement of the guard-arm during its passage by it. It follows, therefore, that the clutch mechanism can only be operated to throw the hub out of gear during the passage of the recessed portion of the hub edge by the guard-arm, at which time the latter may be operated by the lever. If desired, the guard-arm may be thrown forward by this movement of the lever, which disconnects the clutch sufficiently far to bear against the hub, and thus hold it from accidental movement by friction; or, if desired, it may be thrown forward only far enough to engage with the point $x'$, Fig. 4, and by this means prevent the movement of the hub beyond that point by friction.

From the construction of the cam-way, it is evident that the rake may sometimes be stopped when ascending the upward curve of the same. If disconnected at this part, it is evident that its weight would cause it, being free to move, to slide down the cam-way, and possibly cause some damage. To obviate this difficulty a suitable stop device is provided. I preferably provide teeth upon the projecting edge $x$, with which engages a dog or pawl, as shown; but, if desired, the teeth may be on the cam-way and the pawl on the hub, or the dog may act by friction without the teeth, or any other mechanical equivalent may be substituted.

The arrangement of the mechanism for operating the clutch is peculiar. The point of connection of the lever $d^2$ with the foot-treadle, it will be observed, is located in line with the pivots that unite the cutter-bar to the main-gear frame, by which means the relative position of the foot-treadle to the foot of the driver always remains the same, although the relative position of the cutter-bar, upon which the supporting-standard of the clutch mechanism rests, and the main frame, upon which the foot-treadle is located, may be varied.

The general arrangement, also, of the levers and their connections is an advantageous one. By means of the combination and arrangement of the elbow-lever $d^1$ and the lever $d^2$, the motion of the foot-treadle upon one moving frame is communicated to the clutch mechanism upon another.

Having thus fully described my invention, what I claim as new, and desire to secure by Letters Patent of the United States, is—

1. The combination of the following elements—i. e., an independent hub revolving about a vertical center, a cam-way, a rake-carrying arm, and a stop device for preventing the backward movement of the rake upon the cam-way, all the parts operating substantially as described.

2. The combination of the hub F, the rake-arm $f$, and the spring $g$, all constructed and operating substantially as described.

3. The combination of the guard-arm $d^1$ with the lever operating the clutch mechanism, and with the rake-carrying hub, the parts being constructed and operating substantially as described.

4. The combination of the bevel-gear mechanism, consisting of the sleeve J, wheel I with its socket, and gear-wheel K, with the reel and vertically-revolving shaft, the shaft and gear mechanism being adapted to support the inner end of the reel, as described.

5. The combination and arrangement of the lever $d^2$ and its connections, the former having its point of connection with the treadle located in line with the pivots that unite the cutter-bar to the main frame, in order that the foot-treadle which operates the lever may not change its position relatively to the foot of the driver when the bar is adjusted for high and low grain, substantially as described.

This specification signed and witnessed this 28th day of November, 1870.

JAMES HARRIS.

Witnesses:
OBED DANN,
H. B. WILLIAMS.